(12) United States Patent
Foster

(10) Patent No.: US 8,517,792 B1
(45) Date of Patent: Aug. 27, 2013

(54) BOX CALL WITH MAGNETIC HINGE AND METHODS

(75) Inventor: Anthony A. Foster, Brookhaven, MS (US)

(73) Assignee: Primos, Inc., Flora, MS (US)

( * ) Notice: Subject to any disclaimer, the term of this patent is extended or adjusted under 35 U.S.C. 154(b) by 254 days.

(21) Appl. No.: 13/043,805

(22) Filed: Mar. 9, 2011

(51) Int. Cl.
*A63H 5/00* (2006.01)

(52) U.S. Cl.
USPC .......................................... 446/418

(58) Field of Classification Search
USPC .......................................... 446/418
See application file for complete search history.

(56) References Cited

U.S. PATENT DOCUMENTS

| | | | | |
|---|---|---|---|---|
| 4,664,641 A * | 5/1987 | Hearn et al. | ................ | 446/397 |
| 5,210,906 A * | 5/1993 | Aihara et al. | ................ | 16/232 |
| 5,484,319 A * | 1/1996 | Battey | ................ | 446/397 |
| 6,168,493 B1 * | 1/2001 | Kirby | ................ | 446/418 |
| 7,347,762 B1 * | 3/2008 | Long | ................ | 446/418 |
| 8,216,019 B2 * | 7/2012 | Burcham | ................ | 446/418 |

* cited by examiner

*Primary Examiner* — John Ricci
(74) *Attorney, Agent, or Firm* — Holland & Hart

(57) ABSTRACT

A box call includes an elongate box, a lid, and a magnetic hinge. The elongate box includes a pair of longitudinally extending walls, a sound chamber between the walls, and a upper edge on each of the walls. The lid has a contact surface arranged to contact at least one of the upper edges to create a sound. The lid is connected to the box with the magnetic hinge. The magnetic hinge releasably connects the lid to the box using at least one magnetic member.

7 Claims, 9 Drawing Sheets

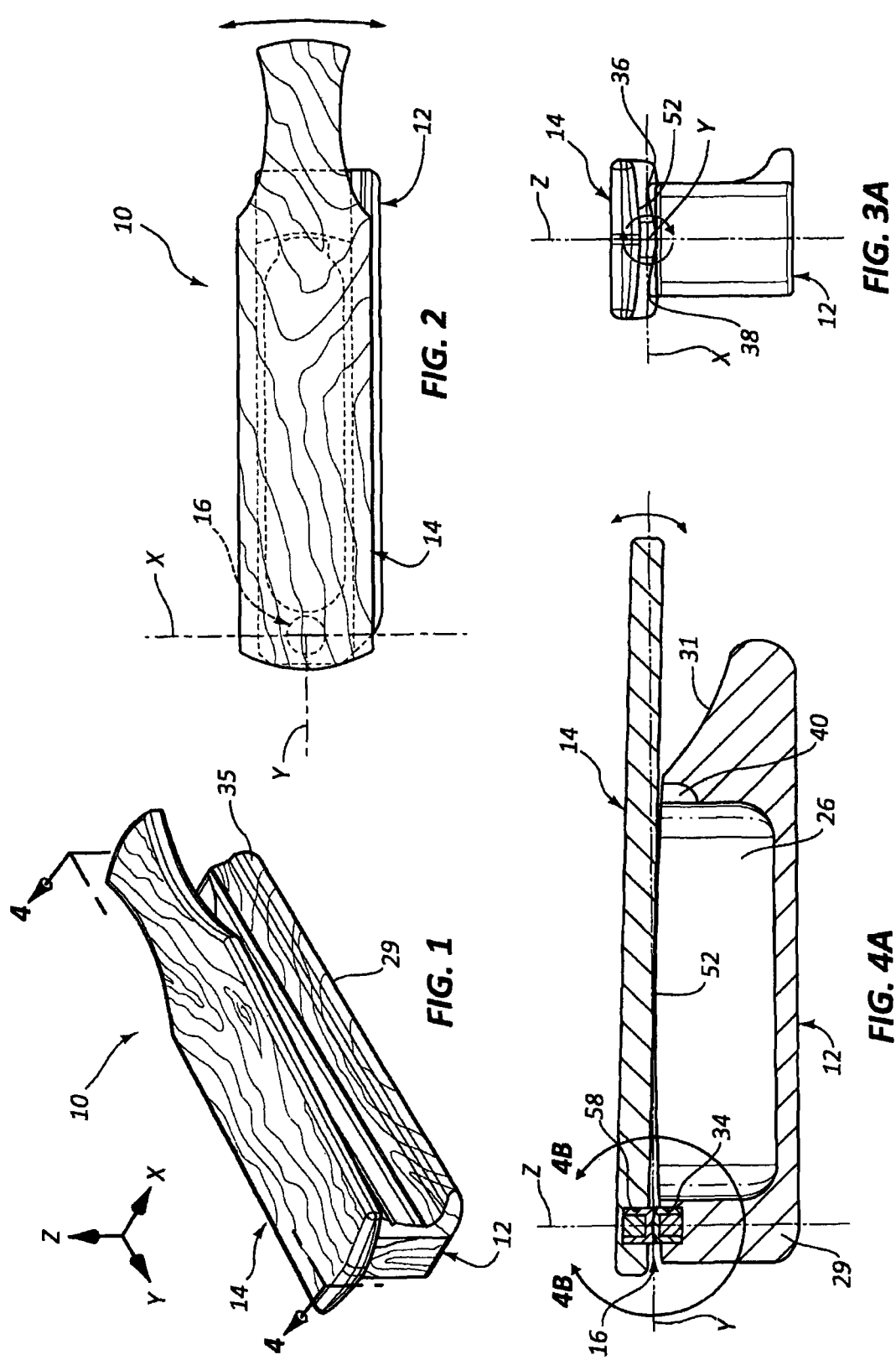

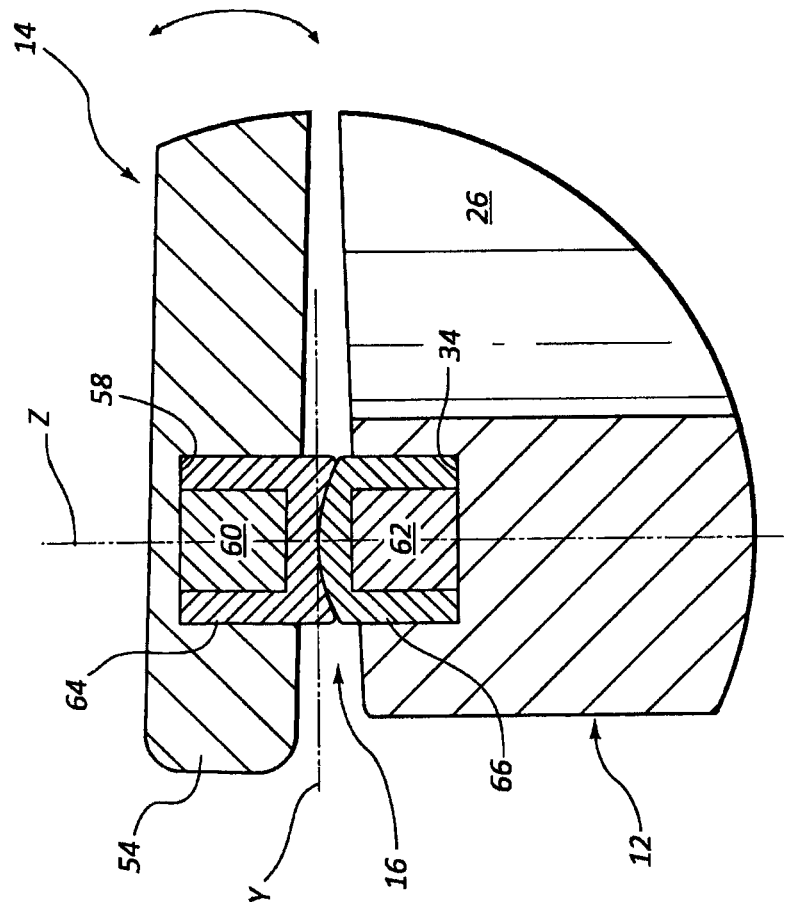

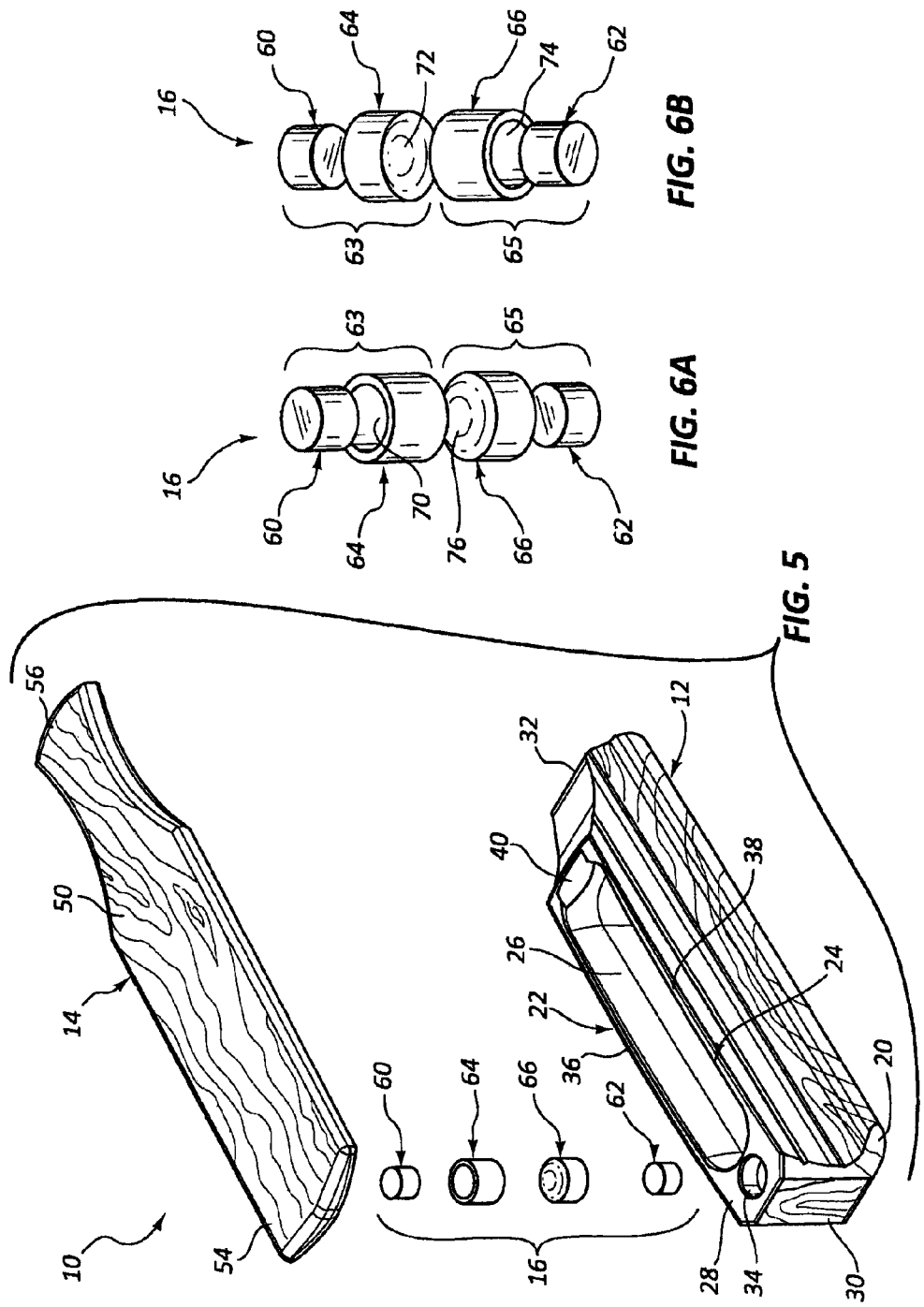

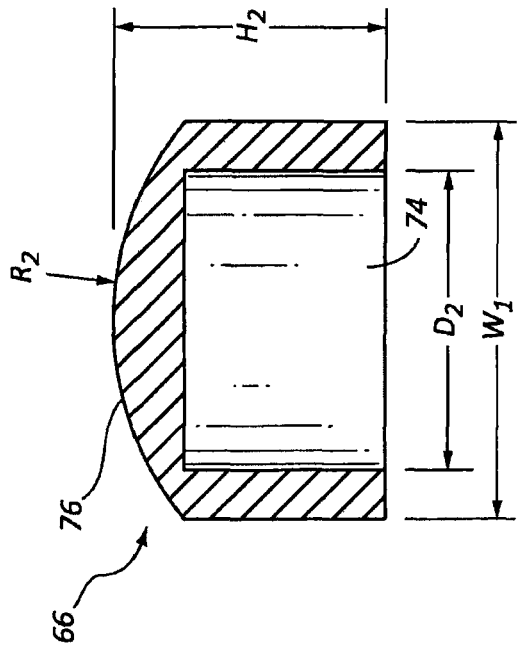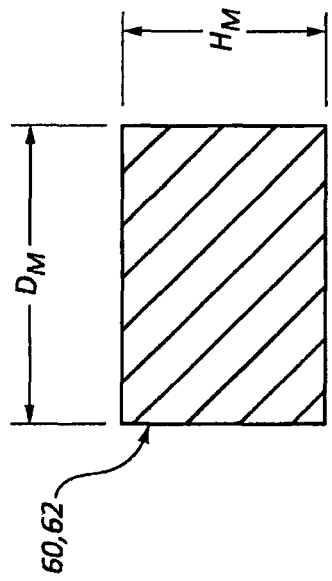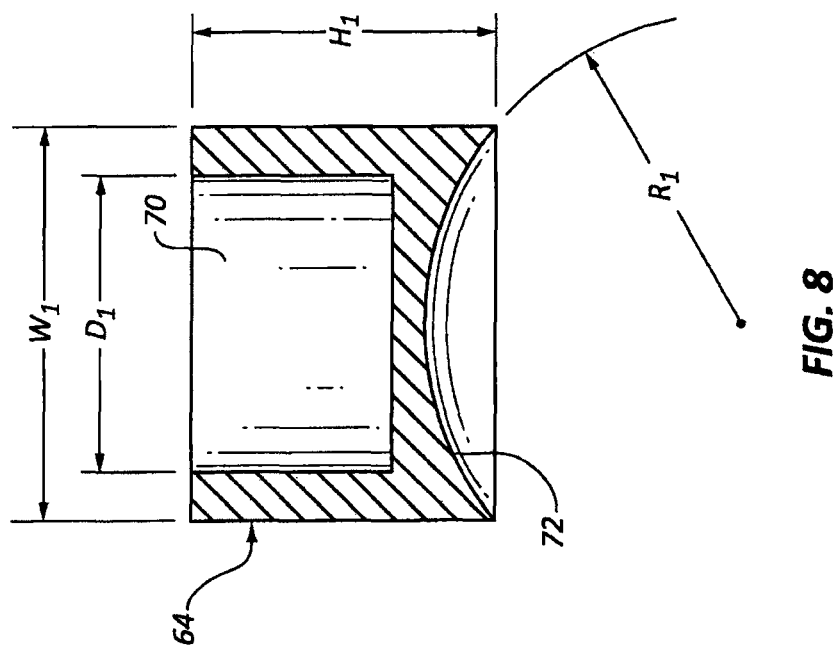
FIG. 9
FIG. 10
FIG. 8

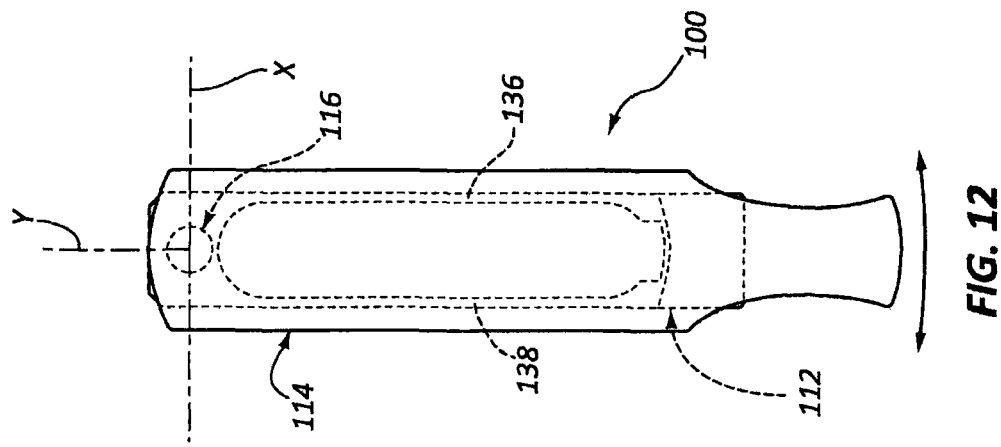
FIG. 12
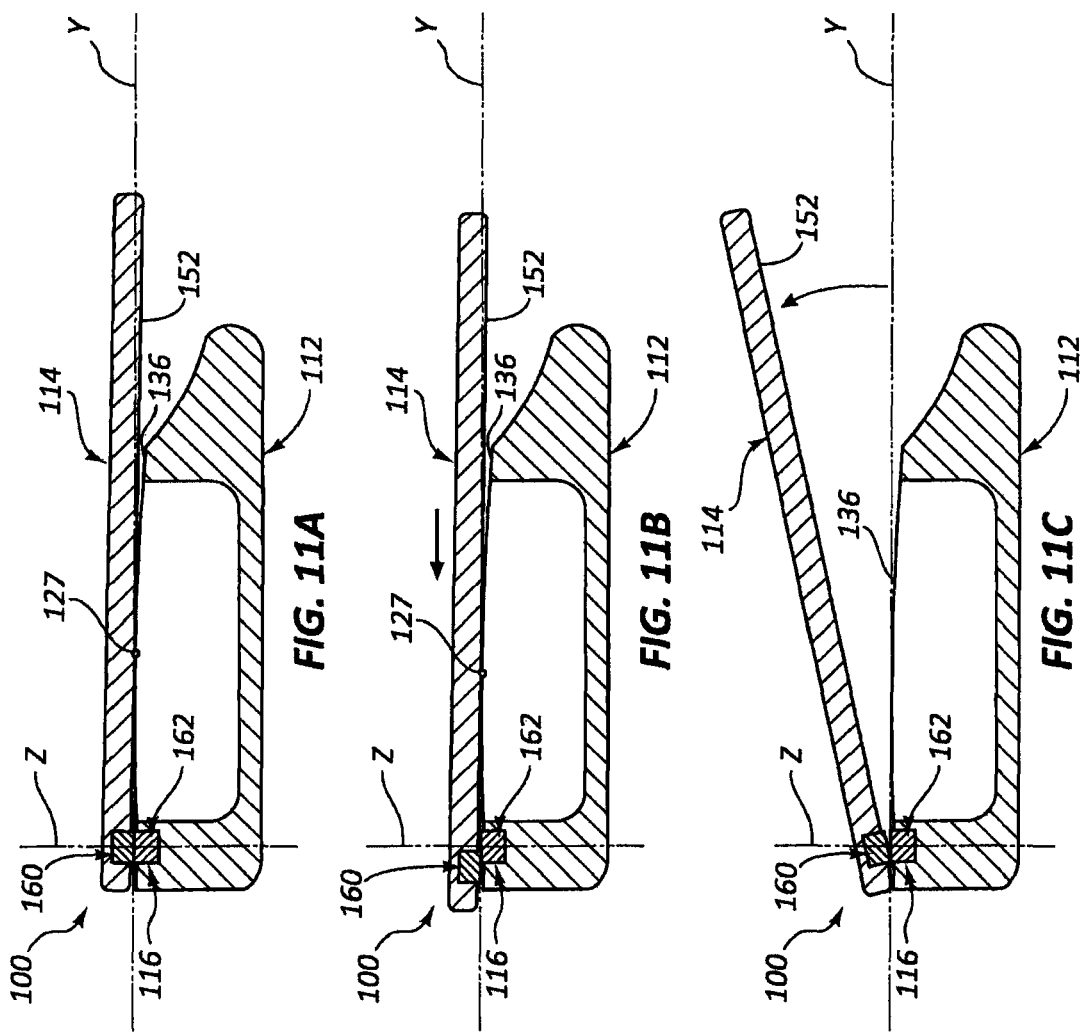
FIG. 11A
FIG. 11B
FIG. 11C

BOX CALL WITH MAGNETIC HINGE AND METHODS

TECHNICAL FIELD

The present application is directed to game calls, and more particularly relates to box call type game calls.

BACKGROUND

In the hunting industry, hunters have used various devices to call turkeys and other wild animals. A box call is a particular type of game call that includes a open or hollow box and a paddle or lid that is dragged across one or two top edges of the box to generate sound. Numerous variations of box calls have been used in the past.

A high level of skill is typically required to successfully operate box calls to create sounds that attract wild animals such as wild turkeys. Variations in force applied to the lid and an angle of the lid may significantly change a sound generated by the box call. The many variations in tone and vocalization possible with a box call typically require practice in order to effectively use the box call in the field.

The angle between the box and lid while operating a box call may have an effect on the particular type of sounds possible and the ability to reproduce the same sound. Some types of box calls include a connection between the lid and box that permits some adjustment of the relative angle between the lid and box during operation. A common connection includes a screw and a coaxially arranged spring that connects the lid to one end of the box. The spring biases the connected end of the lid away from the box so that one end of the lid is slightly elevated relative to a top surface of the box. The opposite end of the lid is movable by the operator in an up-and-down direction and a side-to-side direction to create contact between the lid and top surface of the box. The screw provides a semi-permanent connection between the lid and box, wherein the screw must be unthreaded from the box in order to completely disconnect the lid from the box. The angled position of the lid relative to the box is usually difficult to maintain and reproduce with this type of traditional box call construction.

Opportunities exist for improvements in box call type game calls.

BRIEF SUMMARY

One aspect of the present disclosure relates to a box call that includes an elongate box, a lid, and a magnetic hinge. The elongate box includes a pair of longitudinally extending walls, a sound chamber formed between the walls, and a upper edge on each of the walls. The lid has a contact surface arranged to contact at least one of the upper edges to create sound. The lid is connected to the box via the magnetic hinge. The magnetic hinge releasably connects the lid to the box using at least one magnetic member.

The magnetic hinge may include a first magnet member connected to the lid, and a second magnet member connected to the box, wherein the first and second magnet members provide a magnetic force that releasably connects the lid to the box. The magnetic hinge may include a first magnet cover configured to house the first magnet member, and a second magnet cover configured to house the second magnet member. The first magnet cover may be configured as a female connector having a recess, and the second magnet cover may be configured as a male connector having a protrusion sized to mate with the recess. The first and second magnet covers may define a bearing surface that provides pivotal movement between the lid and box.

The magnetic hinge may be configured to provide pivotal motion about at least two different pivot axes. The magnetic hinge may include first and second hinge members that define a hinge interface, wherein the hinge interface is defined by mating planar surfaces. The lid and box may each include a hinge recess, wherein a portion of the magnetic hinge is positioned in each of the hinge recesses. The magnetic hinge may include a hemispherical recess and a hemispherical protrusion, wherein the hemispherical protrusion is arranged to rotate within the hemispherical recess. The magnetic hinge may include a first portion mounted to the lid that includes a first bearing surface, and a second portion mounted to the box that includes a second bearing surface, wherein separating the first portion from the second portion disconnects the lid from the box.

Another aspect of the present disclosure relates to a box call that includes an elongate box and a lid. The elongate box has a pair of longitudinally extending walls between first and second ends of the box, a sound chamber between the walls, and an upper edge on each of the walls. The lid has an attachment end, a handle end, and a contact surface. The lid is connected to the box at the attachment end, the handle end defines a handle for grasping by an operator to move the lid relative to the box, and the contact surface is arranged to contact the upper edge of at least one of the walls of the box to create a game animal sound. The magnetic hinge is operable to connect the lid to the box and includes a first hinge member mounted to the box and a second hinge member mounted to the lid. At least one of the first and second hinge members has magnetic properties and is configured to exert a magnetic force on the other of the first and second hinge members. The magnetic hinge is operable to provide relative pivotal movement between the lid and box, and may be disassembled to disconnect the lid from the box.

The magnetic hinge may include a bearing surface at an interface between the first and second hinge members, wherein the bearing surface is defined in part by mating contoured surfaces. A relative position between the first and second hinge members may be adjustable to change a relative angled relationship between the contact surface of the lid and the upper edge of at least one of the walls of the box. The first and second hinge members may include first and second housing members, respectively, and first and second magnetic members positioned in the first and second housing members, respectively. The first and second housing members may define a portion of the bearing surface. The magnetic hinge may be configured to disassemble by applying a tension force or a torque force that exceeds the magnetic force.

Another aspect of the present disclosure relates to a method of operating a box call. The method includes providing a box, a lid, and a magnetic hinge, wherein the box includes a sound chamber and the magnetic hinge includes at least one magnetic member. The method further includes connecting the lid to the box with the magnetic hinge, and pivoting the lid relative to the box about the magnetic hinge to contact a portion of the lid against a surface of the box to create a sound.

The method may also include disconnecting the lid from the box by disassembling a portion of the magnetic hinge. The method may include adjusting a relative angle between the lid and box before pivoting the lid relative to the box about the magnetic hinge to contact a portion of the lid against a surface of the box to create a sound. The magnetic hinge may include first and second magnetic members and first and second housing members receptive of the first and second magnetic members, respectively, wherein the method includes magnetizing the first and second housing members with the first and second magnetic members, respectively. The first and second housing members may define a hinge interface, and pivoting the lid relative to the box about the magnetic hinge may include rotating a portion of the first housing member within a recess portion of the second housing member. The magnetic hinge may include first and second hinge members mounted to the lid and box, respectively, wherein at least one of the first and second hinge members includes the at least one magnetic member, and pivoting the lid relative to the box about the magnetic hinge includes separating a portion of the first hinge member from the second hinge member.

BRIEF DESCRIPTION OF THE DRAWINGS

The accompanying drawings illustrate a number of embodiments of the instant disclosure and are part of the specification. Together with the following description, the drawings demonstrate and explain principles of the instant disclosure.

FIG. 1 is a perspective view of an example box call in accordance with the present disclosure.

FIG. 2 is a top view of the box call of FIG. 1.

FIGS. 3A-C are front views of the box call of FIG. 1 in different rotated positions.

FIGS. 4A-D are cross-sectional side views of the box call of FIG. 1 taken along cross-section indicators 4-4 in different rotated positions.

FIG. 5 is an exploded perspective view of the box call of FIG. 1.

FIGS. 6A-B are exploded perspective views of the magnetic hinge of FIG. 4B.

FIG. 8 is a cross-sectional view of the first magnet cover of the magnetic hinge of FIG. 4B.

FIG. 9 is a cross-sectional view of a second magnet cover of the magnetic hinge of FIG. 4B.

FIG. 10 is a cross-sectional view of a magnetic member of the magnetic hinge of FIG. 4B.

FIGS. 11A-C are cross-sectional side views of another example box call having an alternative magnetic hinge design in different rotated positions.

FIG. 12 is a top view of the box call of FIG. 11.

Figure 3C:
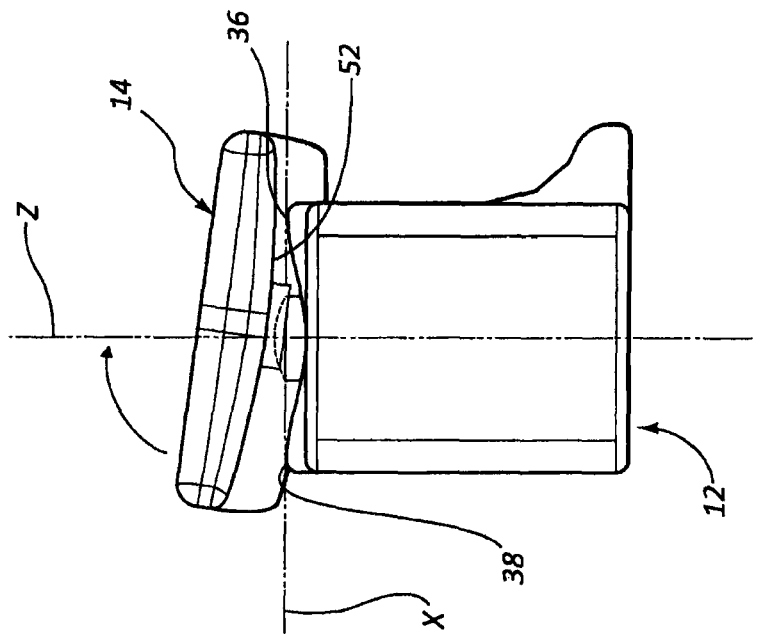
Figure 3B:
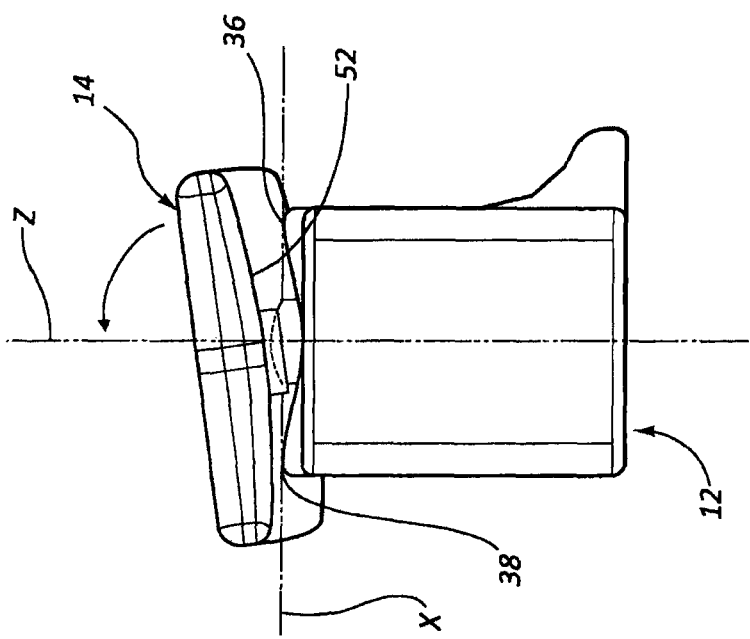

Throughout the drawings identical reference characters and descriptions indicate similar, but not necessarily identical, elements. While embodiments of the instant disclosure are susceptible to various modifications and alternative forms, specific embodiments have been shown by way of example in the drawings and will be described in detail herein. However, one of skill in the art will understand that embodiments of the instant disclosure are not intended to be limited to the particular forms disclosed herein. Rather, the instant disclosure covers all modifications, equivalents, and alternatives falling within the scope of embodiments defined by the appended claims.

DETAILED DESCRIPTION

The present disclosure is directed to game animal calls and more particularly to box-type game calls. Box calls typically include a box-type structure having a sounding cavity, and a lid connected to the box. Relative movement between the lid and the box initiates contact between a surface of the lid (e.g., a contoured bottom surface) with one or more surfaces of the box (e.g., an exposed top edge of a wall that defines, in part, the sounding cavity) to create sounds. The lid is often connected to the box with a fastener such as a screw that may require the use of a tool to adjust tension or the spacing between the lid and the box. Disconnection of the lid from the box may require removal of the fastener using, for example, a tool such as a screwdriver. Some connection systems used to connect the lid to the box are structured to permit adjustment of a position of the lid (e.g., a tilted or rotated position) that helps the operator create a desired sound when contacting the lid with the box while in that adjusted position. However, the adjusted position may be difficult to maintain or reproduce, depending on the structure of the connection system in use.

Another challenge related to box calls is the occurrence of inadvertently generated sounds during hunting. In traditional box call designs where the lid is permanently connected to the box, or connected to the box in a way that requires extra tools or other extra effort to disassemble, the lid and box tend to contact each other to create sound at undesired times. One option for avoiding inadvertent creation of sound is to insert an object between the lid and box to prevent contact. However, the added object may create additional bulk, additional weight, and an additional piece of equipment that the hunter must handle. Further, the added object may cause the "tuned" position of the lid relative to the box to change. Some hunting gear (e.g., vests and jackets) have been designed with pockets specifically sized to receive either the lid or box portion of the box call so that a portion of the gear (e.g., a layer of fabric) is positioned between the lid and box. Once again, however, such a storage system may create problems with respect to the adjustment and functioning of the call.

The amount of pressure applied from the lid onto the edges of the box often determines the type and volume of sounds generated by the box call. Springs are often used at a connection point where the lid and the box are connected to each other. The spring biases the fixed end of the lid away from a top surface of the box. Proper adjustment of the lid relative to the box involves controlling the amount of force applied at the free end of the lid toward the box against biasing forces of the spring while also controlling a spacing between the fixed end of the lid and the box. There has been some success in using springs of different length and compression rating in a given box call to attempt controlling or adjusting this force so that the operator can generate a desired sound from the box call. Proper adjustments to the call, however, as well as disassembly of the box call and handling relatively small springs, especially in the field, may be cumbersome and tedious, and generally undesired.

The box call of the present disclosure includes a connection device or mechanism that secures the lid to the box using magnetic force. The connection mechanism may be referred to as a magnetic hinge, magnetic connector, or connection assembly with a magnetic component. In one example, a magnetic hinge includes at least one magnetic member that exerts a magnetic force sufficient to retain the lid to the box during normal operational use of the box call. The magnetic force of the magnetic hinge may be overcome by applying additional force (e.g., torque or linear forces) outside of the normal operating force that overcomes the magnetic forces to disconnect the lid from the box.

The magnetic member may provide a known connection force for securing the lid to the box. The magnetic member may be exchanged with magnetic members having different magnetic force to optimize the force applied at the free end of the lid toward the box. The use of magnetic members may also provide relatively quick and easy disassembly and stowage of the box call when not in use to reduce the possibility of generating unwanted sounds while hunting.

The magnetic hinge may include features that permit some relative adjustment between the lid and box such as adjusting a tilt angle or rotated position of the lid relative to the box in order to generate a desired sound (e.g., a pitch or tone of the sound) or volume of the sound from the box call. An example magnetic hinge construction includes a type of ball-and-socket interface or connection that permits rotation movement about multiple axis of rotation passing through the magnetic hinge. Such a ball-and-socket type connection may include any type of curved, concave/convex, or similar mating surfaces that allow relative movement between the two connection members. In one arrangement, the magnetic hinge includes a hemispherical recess that mates with a hemispherical protrusion to provide rotation about a plurality of perpendicularly arranged axis passing through the magnetic hinge. In other arrangements, a magnetic hinge includes a bearing surface with mating contoured or mating planar surfaces that provide the desired adjustability between the box and lid. The magnetic force exerted by the magnetic member of the magnetic hinge may be adjustable. The magnetic force may also permit some relative adjustment between the lid and box without disconnection of the lid from the box. The adjustability between the lid and box provided by a magnetic hinge may permit the operator to create different sounds and may allow the user to replicate the same sound more easily using the same box call.

Figure 4C:
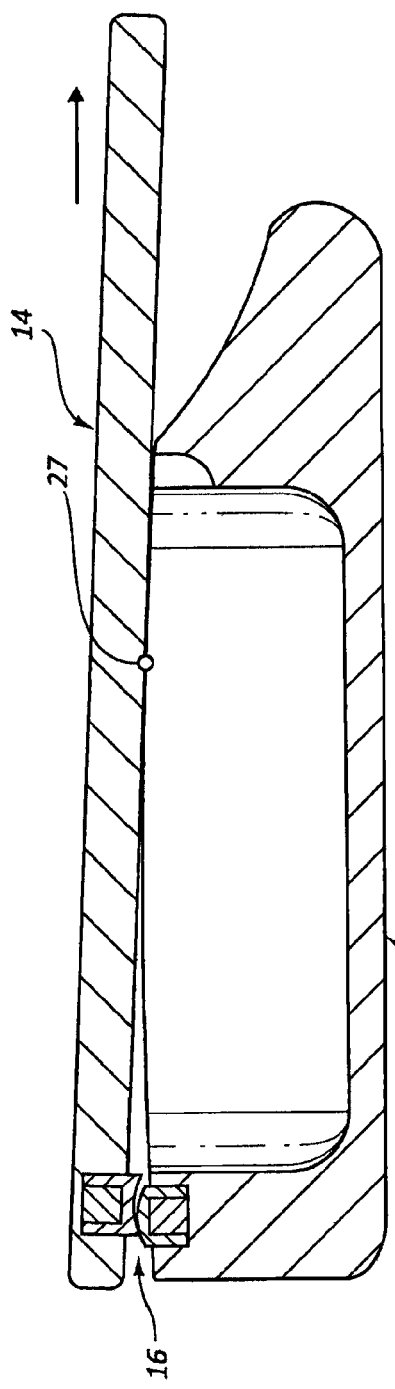
Figure 4D:
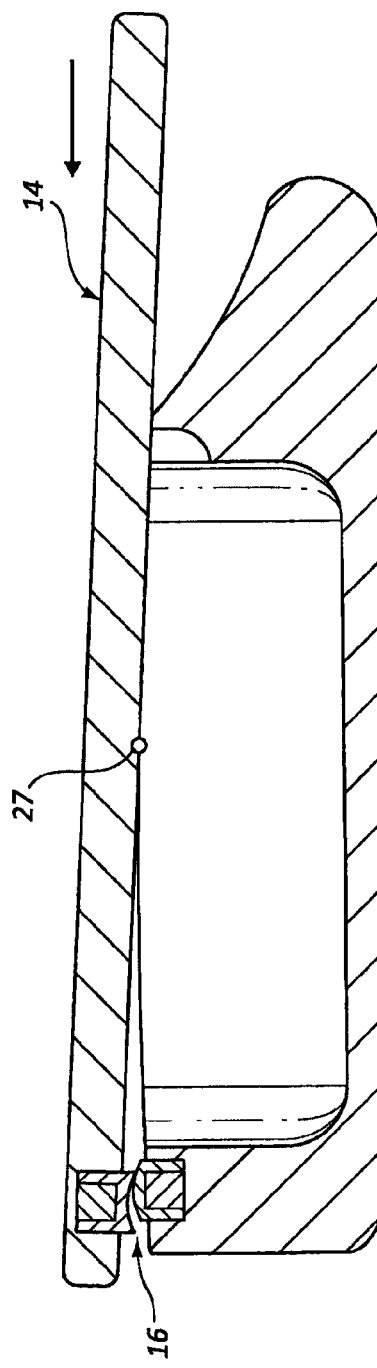
Figure 7:
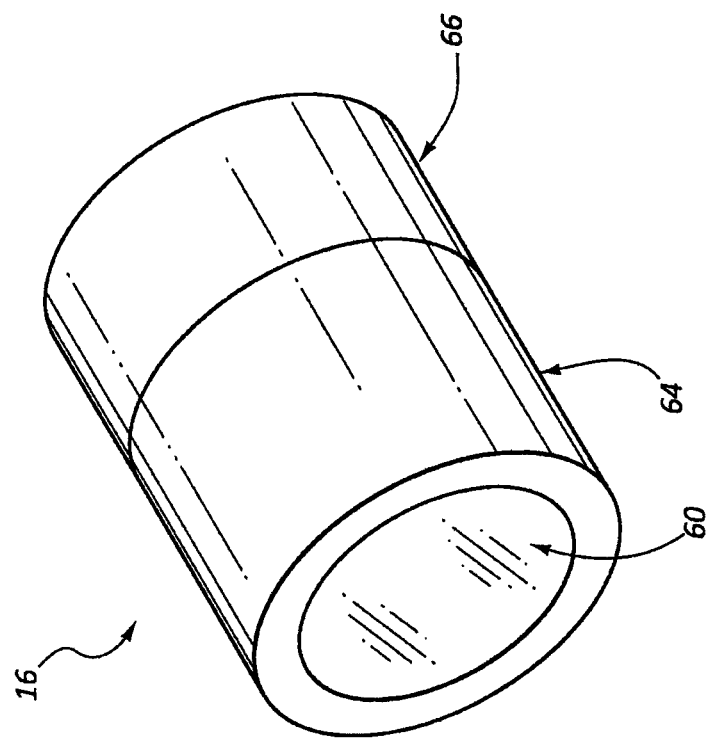
FIG. 7 is a perspective view of the magnetic hinge of FIG. 4B.
Figure 14:
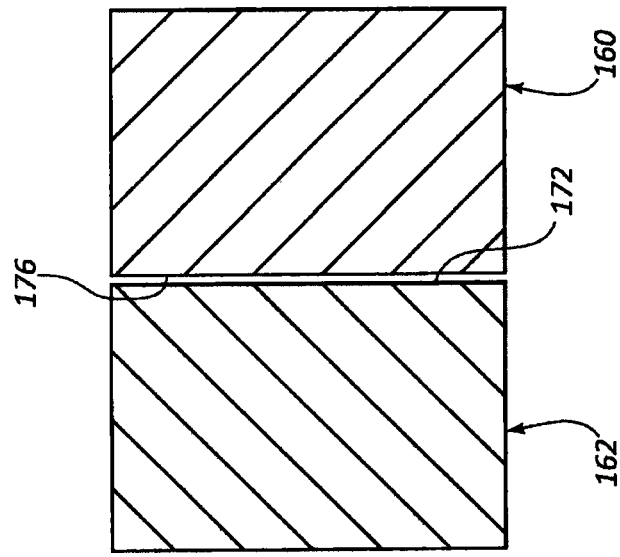
FIG. 14 is a cross-sectional view of the magnetic hinge of FIG. 13 assembled together.
Figure 13:
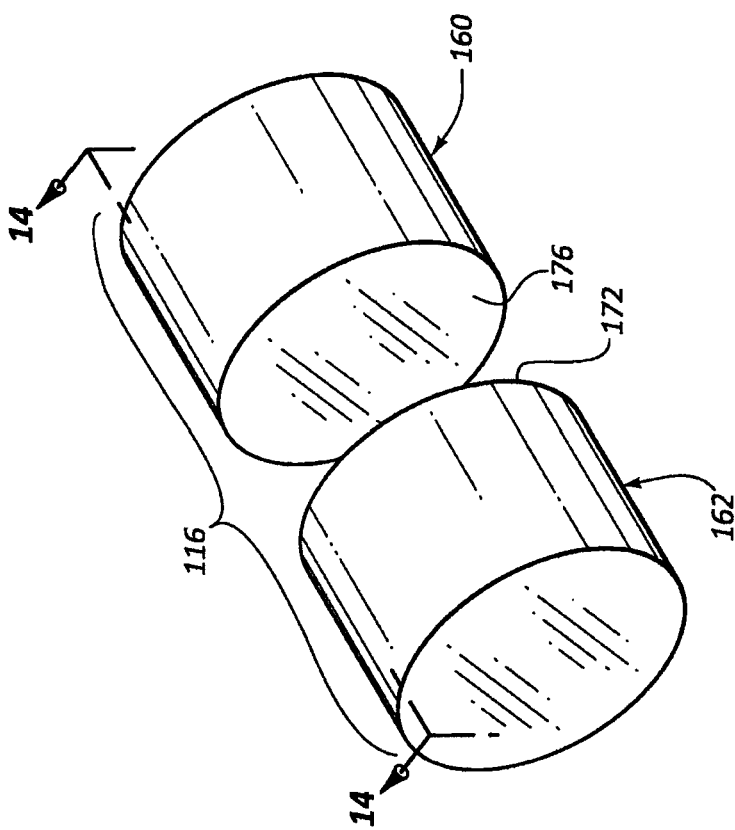
FIG. 13 is an exploded perspective view of the magnetic hinge of FIG. 11.

Referring to FIGS. 1-10, an example box call 10 includes a box 12 and a lid 14 (see FIGS. 1-5), and a magnetic hinge 16 (see FIGS. 4A-B). The lid 14 is connected to the box 12 at a fixed or connection end using the magnetic hinge 16. An opposite or free end of the lid 14 includes a handle feature that permits the operator to move the free end to contact the lid 14 against the box 12 to create sounds. Different portions of the magnetic hinge 16 may be mounted to each of the box 12 and lid 14. Magnetic hinge 16 may be dissembled into first and second hinge portions or hinge members 63, 65 to permit disconnection of the lid 14 from the box 12. When the first and second portions 63, 65 of the magnetic hinge 16 are connected together to connect the lid 14 to the box 12, some relative movement between the different portions of the magnetic hinge 16 may be possible to permit adjustment of a position of the lid 14 relative to the box 12. In some arrangements, the magnetic hinge 16 is permanently assembled to provide a permanent connection between the lid 14 and box 12, unless the magnetic hinge 16 is physically removed from at least one of the lid 14 and box 12.

The box 12 includes a base 20, first and second longitudinal walls 22, 24, a sound chamber 26, a top surface 28, first and second ends 30, 32, and a box hinge recess 34. The first and second longitudinal walls 22, 24 extend along opposing sides of the sound chamber 26. Each of the first and second longitudinal walls 22, 24 includes an upper edge 36, 38, respectively. The upper edges 36, 38 may be contoured along a length of the box 12 from the first end 30 to the second end 32.

The sound chamber 26 may have an outlet 40. In one example, the outlet 40 is positioned at the second end 32. The box hinge recess 34 may be defined in the top surface 28. The box hinge recess 34 is typically positioned at the first end 30 (see FIG. 5).

The base 20 may include a flange portion 35 along a bottom side 29 (see FIG. 1) which may assist the operator in holding the box call 10 during operation. The base 20 may also have a tapered portion 31 at the second end 30 (see FIG. 4A) which provides additional room for the operator to grasp the lid 14 during operation.

Lid 14 includes a top surface 50, a bottom surface 52, a connection end 54, a handle end 56, and a lid hinge recess 58. The bottom surface 52 may be contoured as shown in at least FIG. 3. The contour of the bottom surface 52 in the X direction (see FIG. 3) in combination with the contoured upper edges 36, 38 of the box 12 in the Y direction (see FIG. 4A) promote a point or line contact between the lid 14 and box 12. This limited point or line contact may enhance the operator's ability to create a desired sound using the box call 10.

A portion of the magnetic hinge 16 is positioned within the lid hinge recess 58 at the connection end 54. A separate portion of the magnetic hinge 16 is positioned within the box end recess 34 of the box 12. Relative movement between the lid 14 and box 12 may be limited at the magnetic hinge 16 and maximized at the handle end 56 furthest from the magnetic hinge 16. In some arrangements, at least one of the first and second hinge portions 63, 65 is mounted directly to the bottom surface 52 of the lid 14 and top surface 28 of the box 12, respectively, rather than in one of the hinge recesses 34, 58.

The handle end 56 may be shaped to promote easier grasping by the operator. The lid 14 may extend beyond the second end 32 of the box 12 when the box call 10 is assembled as shown in FIG. 1.

The magnetic hinge 16 includes first and second magnetic members 60, 62 and first and second magnet covers 64, 66 (see FIGS. 5-10). The first and second magnet covers 64, 66 may also be referred to as first and second housing members 64, 66. Referring to FIG. 10, the first and second magnetic members 60, 62 may be similar in size and shape and may be interchangeable within the first and second magnet covers 64, 66. In one example, the first and second magnetic members 60, 62 each includes a magnet diameter $D_M$ and a magnet height $H_M$. The magnetic diameter $D_M$ may be a maximum width dimension of the first and second magnetic members 60, 62. Other shapes and sizes are possible for the first and second magnetic members 60, 62. For example, the generally cylindrical-shaped construction with a circular cross-section of the first and second magnetic members 60, 62 shown in FIGS. 6A-B may in other embodiments include a square, hexagonal, oval or other cross-sectional shape. The first and second magnetic members 60, 62 may have other shapes besides a cylindrical shape such as, for example, an oval or egg shape, a spherical shape, or a flat plate shape. The generally cylindrical shaped first and second magnetic members 60, 62 may permit a simplified, interchangeable construction for the first and second magnet covers 64, 66 to receive the first and second magnetic members 60, 62.

The first and second magnetic members 60, 62 may comprise a material that is magnetically charged or provides a magnetic force. The first and second magnetic members 60, 62 typically comprise a ferrous material. The material of the first and second magnetic members 60, 62 may have such properties as corrosion resistance and wear resistance, and may have a relatively smooth surface finish. In some arrangements, the magnetic hinge 16 is operable using direct contact between the first and second magnetic members 60, 62 without the use of first and second magnet covers 64, 66.

The first and second magnet covers 64, 66 are typically sized and constructed to receive at least a portion of the first and second magnetic members 60, 62, respectively. The first and second magnet covers 64, 66 may include bearing surfaces that provide a bearing interface between the first and second hinge portions 63, 65. This bearing surface or bearing interface may provide a hinge function. The first and second magnet covers 64, 66 may protect the first and second magnetic members 60, 62 from environmental conditions and provide an improved bearing interface. The first and second magnet covers 64, 66 may comprise materials that take on the same magnetic properties (e.g., polarity) as the magnet member housed within the first and second magnet covers 64, 66. In other arrangements, the first and second magnet covers 64, 66 comprise unmagnetized or neutral-charged materials that act as a spacer between the first and second magnetic members 60, 62. In some arrangements, the first and second magnet covers 64, 66 may permit easier separation of the first and second magnetic members 60, 62 than without the first and second magnet covers 64, 66 present.

The first magnet cover 64 includes a first magnet recess 70 and a hinge recess 72. The first magnet recess 70 has a first diameter or maximum dimension $D_1$ (see FIG. 8). The hinge recess 72 has a first radius $R_1$. The hinge recess 72 is accessible on an opposite side of the first magnet cover 64 from the first magnet recess 70. The hinge recess 72 may be generally hemispherical shaped. The hinge recess 72 may be referred to as a female hinge surface or a concave hinge surface. The first magnet cover 64 includes a first width or outer dimension $W_1$ and a first height $H_1$. A portion of the first magnet cover 64 is positioned between the first magnet recess 70 and the hinge recess 72.

The second magnet cover 66 includes a second magnet recess 74 and a hinge protrusion 76. The second magnet recess 74 includes a second diameter or maximum dimension $D_2$. The hinge protrusion 76 is position on the opposite side of the second magnet cover 66 from the second magnet recess 74. The hinge protrusion 76 has a second radius $R_2$. The hinge protrusion 76 may be generally hemispherical shaped. The hinge protrusion 76 may be referred to as a male hinge surface or a convex hinge surface. The second magnet cover 66 has a second width or diameter $W_2$ and a second height $H_2$. Typically, the second radius $R_2$ is substantially equal to the first radius $R_1$. The second diameter $D_2$ and second width $W_2$ may be substantially equal to the first $D_1$ and first width $W_1$, respectively. The first and second height $H_1$ and $H_2$ may have any desire dimension, although in some arrangements, may be substantially equal.

In one example, the diameters $D_1$ and $D_2$ are in the range of about 0.25 inches to about 0.5 inches and were preferably about 0.38 inches. The first and second widths $W_1$ and $W_2$ are typically in the range of about 0.4 inches to about 0.6 inches, and more preferably about 0.5 inches. The first and second heights $H_1$, $H_2$ are typically in the range of about 0.25 inches to about 0.5 inches, and more preferably about 0.38 inches. The first and second radius $R_1$, $R_2$ are typically in the range of about 0.25 inches to about 0.5 inches and more preferably in the range of about 0.38 inches.

The size, shape, and material composition of the first and second magnet covers 64, 66 may vary dependent on a number of factors including, for example, the size, shape and materials of the first and second magnetic members 60, 62. In some arrangements, one of the first and second magnetic members 60, 62 comprises a material that has little or no magnetic charge while the other magnetic member comprises a strong magnetic charge that attracts the other magnetic member. The first and second magnetic cover 64, 66 may or may not comprise a magnetically charged material.

The generally cylindrical shape of the first and second magnet covers 64, 66 with a circular cross-section may be used for ease in manufacturing and assembly of the box call 10. For example, the cylindrical shape may be sized to fit within a relatively easily formed, cylindrical shaped box recess 34 or lid hinge recess 58. In some arrangements, the size and shape of the magnetic hinge 16 may be of less importance if, for example, these portions of the magnetic hinge 16 are encapsulated within, embedded within, or mounted on an exterior surface of the box 12 and with 14.

A combination of the first magnetic member 60 and the first magnet cover 64 may be referred to as a first hinge portion 63 or a female hinge member 63 (see FIGS. 6A-B). The combination of the second magnetic member 62 and second magnet cover 66 may be referred to as a second hinge portion 65 or a male hinge member 65 (see FIGS. 6A-B). The first and second hinge portion 63, 65 may include at least one magnetic member and at least one magnet cover sized to house a portion of the magnetic member. In other arrangements, at least one of the first and second hinge portion 63, 65 includes a magnetic member without a magnet cover.

The first and second hinge portions 63, 65 may be mounted to the lid 14 and box 12, respectively, with at least a portion of the first and second hinge portions 63, 65 exposed outside of the lid 14 and box 12. Exposing a portion of the hinge protrusion 76 outside of the box 12 may provide clearance for additional pivotal motion of the first hinge portion 63 about any of the X, Y and Z axis without interference with the top surface 28 of the box 12. Exposing portions of the magnetic hinge 16 outside of the box 12 and lid 14 may also help space apart the connection or fixed end of the lid 14 relative to the box 12 to permit additional freedom of movement therebetween.

The generally hemispherical interface between the hinge recess 72 and hinge protrusion 76 may permit rotational movement about at least the X, Y and Z axis as shown in FIGS. 1-4D. Other hinge interfaces may be provided such as, for example, a ball-and-socket type construction, a hinge construction, a sliding or planer interface, or any of variety of constructions that permit some relative movement between the first and second hinge portions 63, 65. Referring to FIGS. 3A-C, rotation of the lid 14 about the Y axis may change a possible contact point between the lid 14 and box 12 from one upper edge 36 to the other upper edge 38. Referring to FIGS. 4A-D, rotating the lid 14 about the X axis may change a possible contact point along the length of either one of the upper edges 36, 38.

Another example box call 100 having a magnetic hinge with a planar interface or hinge surface is shown with reference to FIGS. 11-14. FIGS. 11A-C show the lid in various rotated positions about the X axis. The planar construction of the hinge surfaces 172, 176 of the first and second magnetic members 160, 162, respectively, creates a pivot motion about an edge of the first or second magnetic members 160, 162 as shown in at least FIG. 11C. This type of pivot motion may provide a constant contact point along the upper edges 136, 138 of the box 112.

Rotation of the lid 114 about the Z axis is typically possible as shown in FIG. 12, wherein some sliding between the surfaces 172, 176 occurs. Rotation about the Y axis may be more difficult because such rotation requires some separation of the first and second magnetic members 160, 162 by overcoming the magnetic force that holds the first and second magnetic members 160, 162 together using limited leverage.

Any magnetic hinge construction that includes at least one magnetic member falls within the spirited scope of the present disclosure. Although the magnetic hinges 16, 116 described herein may be disassembled (e.g., disconnecting the first hinge portion 63 from the second hinge portion 65 while the first hinge portion 63 remains mounted to the lid 14 and the second hinge portion 65 remains mounted to the box 12) other magnetic hinge constructions are possible that do not permit disassembly of the magnetic hinge 16, 116 or disconnection of the lid 14, 114 from the box 12, 112.

The various magnetic hinge constructions disclosed herein may provide improved control over the type of sound and volume of sound generated with the box call. The magnetic hinge constructions may provide infinite angle adjustability between the lid and box that provides improved control of the sound generated when using the box call. The magnetic hinge constructions may permit adjustment of an angle or position of the lid relative to the box to provide more or less pressure from the lid to the box to alter a volume, pitch, or tone of the generated sound. The relative angle or position of the magnetic members of the magnetic hinge may be pre-set by the manufacturer or adjusted into a desired position by a user may create particular sounds and sound volume when using a box call having the magnetic hinge constructions disclosed herein. The releasability of the magnet members of the magnetic hinge construction may provide greater ease in making adjustments in the relative positions between the lid and box during use of the box call.

The preceding description has been provided to enable others skilled in the art to best utilize various aspects of the exemplary embodiments described herein. This exemplary description is not intended to be exhaustive or to be limited to any precise form disclosed. Many modifications and variations are possible without departing from the spirit and scope of the instant disclosure. It is desired that the embodiments described herein be considered in all respects illustrative and not restrictive, and that reference be made to the appended claims and their equivalents for determining the scope of the instant disclosure. In addition, for ease of use, the words "including" and "having," as used in the specification and claims, are interchangeable with and have the same meaning as the word "comprising."

What is claimed is:

1. A box call, comprising:
   an elongate box having a pair of longitudinally extending walls, a sound chamber between the walls, and a upper edge on each of the walls;
   a lid having a contact surface arranged to contact at least one of the upper edges to create a sound, the lid being connected to the box with a magnetic hinge, the magnetic hinge releasably connecting the lid to the box using at least one magnetic member;
   wherein the magnetic hinge includes a first magnet member connected to the lid, and a second magnetic member connected to the box, the first and second magnet members providing a magnetic force that releasably connects the lid to the box;
   wherein the magnetic hinge includes a first magnet cover configured to house the first magnet member, and a second magnet cover configured to house the second magnet member.

2. The box call of claim 1, wherein the first magnet cover is configured as a female connector having a recess, and the second magnet cover is configured as a male connector having a protrusion sized to mate with the recess.

3. The box call of claim 1, wherein the first and second magnet covers define a bearing surface that provides pivotal movement between the lid and box.

4. A box call, comprising:
   an elongate box having a pair of longitudinally extending walls, a sound chamber between the walls, and a upper edge on each of the walls;
   a lid having a contact surface arranged to contact at least one of the upper edges to create a sound, the lid being connected to the box with a magnetic hinge, the magnetic hinge releasably connecting the lid to the box using at least one magnetic member;
   wherein the magnetic hinge is configured to provide pivotal motion about at least two different pivot axes.

5. A box call, comprising:
   an elongate box having a pair of longitudinally extending walls, a sound chamber between the walls, and a upper edge on each of the walls;
   a lid having a contact surface arranged to contact at least one of the upper edges to create a sound, the lid being connected to the box with a magnetic hinge, the magnetic hinge releasably connecting the lid to the box using at least one magnetic member;
   wherein the magnetic hinge includes first and second hinge members that define a hinge interface, the hinge interface being defined by mating planar surfaces.

6. A method of operating a box call, comprising:
   providing a box, a lid, and a magnetic hinge, the box including a sound chamber, the magnetic hinge including at least one magnetic member;
   connecting the lid to the box with the magnetic hinge;
   pivoting the lid relative to the box about the magnetic hinge to contact a portion of the lid against a surface of the box to create a sound;
   further comprising disconnecting the lid from the box by disassembling a portion of the magnetic hinge.

7. A method of operating a box call, comprising:
   providing a box, a lid, and a magnetic hinge, the box including a sound chamber, the magnetic hinge including at least one magnetic member;
   connecting the lid to the box with the magnetic hinge;
   pivoting the lid relative to the box about the magnetic hinge to contact a portion of the lid against a surface of the box to create a sound;
   further comprising adjusting a relative angle between the lid and box before pivoting the lid relative to the box about the magnetic hinge to contact a portion of the lid against a surface of the box to create a sound.

* * * * *